United States Patent
Gilbert

(10) Patent No.: US 7,271,813 B2
(45) Date of Patent: Sep. 18, 2007

(54) ROTATIONAL DISPLAY SYSTEM

(75) Inventor: Mark Gilbert, Tuscaloosa, AL (US)

(73) Assignee: Lightning Wheels, LLC, Palm Beach, FL (US)

( * ) Notice: Subject to any disclaimer, the term of this patent is extended or adjusted under 35 U.S.C. 154(b) by 61 days.

(21) Appl. No.: 11/187,625

(22) Filed: Jul. 21, 2005

(65) Prior Publication Data

US 2006/0038831 A1 Feb. 23, 2006

Related U.S. Application Data

(60) Provisional application No. 60/589,651, filed on Jul. 21, 2004.

(51) Int. Cl.
*G09G 5/00* (2006.01)

(52) U.S. Cl. .............. 345/619; 345/649; 345/652

(58) Field of Classification Search ........ 345/619; 340/815.4
See application file for complete search history.

(56) References Cited

U.S. PATENT DOCUMENTS

| | | | | |
|---|---|---|---|---|
| 4,115,942 A | * | 9/1978 | Sears | 40/547 |
| 4,338,547 A | * | 7/1982 | McCaslin | 315/312 |
| 4,631,848 A | * | 12/1986 | Iwasa et al. | 40/427 |
| 5,057,827 A | * | 10/1991 | Nobile et al. | 345/31 |
| 6,072,386 A | * | 6/2000 | Yu | 340/432 |
| 6,492,963 B1 | * | 12/2002 | Hoch | 345/39 |
| 6,575,585 B2 | | 6/2003 | Nelson et al. | |
| 6,856,303 B2 | * | 2/2005 | Kowalewski | 345/31 |
| 7,079,042 B2 | * | 7/2006 | Reim | 340/815.45 |
| 2002/0133282 A1 | * | 9/2002 | Ryan et al. | 701/70 |
| 2004/0102223 A1 | | 5/2004 | Lo et al. | |
| 2004/0105256 A1 | | 6/2004 | Jones | |

OTHER PUBLICATIONS

BigWheels.net—DUB Pimpstar [online] [retrieved on Feb. 22, 2007] http://www.bigwheels.net/promotion/pimpstar.html.

* cited by examiner

*Primary Examiner*—Kee M. Tung
*Assistant Examiner*—Good-Johnson Motilewa
(74) *Attorney, Agent, or Firm*—McHale & Slavin, P.A.

(57) ABSTRACT

The present invention provides a system which integrates unique lighting technologies, switching systems, mounting systems, information delivery systems and power supply systems within a vehicular wheel to provide an advanced, high quality visual display apparatus. These technologies, and their many unique applications, provide for a novel and useful series of video display devices that are small, light-weight, efficient and have the capability of producing a clear, bright, high definition image that is equivalent to that of a modern day TV or high quality computer monitor.

17 Claims, 11 Drawing Sheets

US 7,271,813 B2

ROTATIONAL DISPLAY SYSTEM

FIELD OF THE INVENTION

This application claims priority under 35 USC 119(e) to the Provisional Patent Application No. 60/589,651, filed Jul. 21, 2004.

This invention relates generally to automotive lighting systems. More specifically, the present invention relates to the display of visual images and/or display of visual information such as pictures, text and full motion video sequences on the rotating wheels of a vehicle.

BACKGROUND OF THE INVENTION

Numerous systems for producing visual images and displaying visual information such as pictures, text and full motion video sequences were developed over a century ago. One such technology developed utilizes rotating assemblies having intermittently illuminated elements to produce text or basic shapes. The rotation, combined with rapidly changing illuminated segments produces a series of flashing frames that blend to form a recognizable image, or series of images. This effect is broadly known as persistence of vision and is more specifically referred to as "scanning". In modern devices that utilize persistence of vision technology, electronic information about an image to be displayed is used to synchronize the illumination of individual illuminating elements at specific positions during the rotation.

There are generally two types of persistence of vision displays currently known in the art; cylindrical and planar. A cylindrical display rotates an LED display in a manner that creates images in a cylindrical manner, as if the images were on the side of a soda can. A planar display rotates the LEDs so that they appear in a flat disk shaped area. Within the planar display, small bright illuminating elements are typically arranged along an elongated flat member. An axle is positioned at about the mid-point of the flat member, similar to an airplane propeller, and a motor is provided to rotate the member at a relatively high speed. As the flat member rotates, the blur perceived by the eye makes the rotating member appear to be a flat circle. This virtual circle formed by the spinning member forms a visual image when color, brightness and timing of the illuminating sections on the member are properly synchronized.

One of the earliest examples of image producing systems that utilized a rotating member, a series of illuminating devices and a system of synchronizing to display an image was developed and patented by Paul Gottlieb Nipkow from Germany. Nipkows' system of receiving and reproducing images utilized a selenium photocell and a (rotating) scanning disk. In order to capture an image, his early (1884) system employed a scanning disk with a single row of holes arranged so they spiraled inward toward the center of the circle. The disk revolved in front of a light sensitive plate on which a lens formed an image. Each hole passed across, or "scanned" a ring shaped portion of the image. The holes traced contiguous concentric circles so that in one revolution of the disk, the entire image was scanned, converting a visible image to a series of electrical signals. A similar rotating disk system was used to reproduce the image that had been scanned. By rapidly switching a series of lights aligned with the holes in the rotating disk, synchronized illumination passed through holes tracing an image with many concentric circles of light.

Similar systems that followed Nipkow's original designs include developments by J. L. Baird in England and F. Jenkins in the United States, both of whom successfully demonstrated television systems using scanning disks in 1926. Such systems produced 60 to 100 scanned lines to provide recognizable black and white images that were high quality by 1926 standards.

Research and development of video display systems that employed rotating mechanical scanning came to a stop after the nearly simultaneous invention of electronic scanning systems by Philo T. Farnsworth in 1927 and by Vladimir K. Zworykin in 1928. Both the Farnsworth and the Zworykin systems of the mid and late 1920's scanned an electron beam back and forth across the inside of a glass cathode ray tube, striking a phosphorescent surface plane, causing images to appear on a glass picture tube. The electronic scanning picture tube designs developed by both inventors became the foundations for the cathode ray tube that was further perfected and marketed in the first home television receivers. Significant picture tube improvements were developed by Allen B. DuMont who increased the reliability, quality and display size of picture tubes during the 1930's. The same electron scanning technology has evolved into the high quality glass picture tubes that are still found in present day color (picture tube type) televisions and computer monitors.

The aforementioned inception of electronic picture tubes during the late 1920's effectively signaled the end of mechanical rotating image display systems by the 1930's. Early picture tubes were essentially sealed, low maintenance systems with no mechanical components. Such improvements rendered rotary image display systems obsolete. The illumination systems, propulsion means, synchronization circuits and power requirements of rotary mechanical visual display systems made them heavy, bulky, inefficient, unreliable and of marginal value due to low video quality when compared to cathode ray tube visual displays. Thus, cathode ray tubes became the industry standard by the 1930's. Consequently, rotational scanning technology as a means of image display had largely been forgotten until very recently with the implementation of a few new products, and with the new technology disclosed herein. Several recent products employ new uses and variations thereof based on illuminated rotational scanning display systems. Likewise, these newer developments define a group of prior art that are related to the new and useful invention described herein.

One such prior art development is presented in U.S. Publication No. 2004/0102223 to Lo. Lo describes a rotating LED device that receives data by infrared transmission and then displays such data by synchronizing the illumination display of a row of rotating LEDs. The device is specifically embodied as both a functional and ornamental device that is used to display incoming telephone caller numbers as a caller ID apparatus, and further displays other alpha-numeric information such as the time, date and a few pre-programmed seasonal greetings that are stored in the unit's internal memory. Since the rotating member containing the LED array must synchronize the display of information as rapidly as it rotates, Lo describes a system that transmits infrared signals to a rotating illuminating member, from an infrared transmitter located in the stationary base unit. This effectively separates the actual rotating member and LED array from its support circuits that need not rotate in order to produce a visual image. The infrared system described provides a wireless path by which information to be displayed is beamed directly to a small infrared receiver that is part of the rotating display system. This design minimizes the amount of parts that must rotate, thus minimizing rotational mass, minimizing the weight of moving parts. However, because the device derives both a positional reference point and data concurrently as a predetermined point on the rotating arm passes the infrared sender, the amount of data that can be transferred is very limited.

Thus, Lo's device is limited to displaying alpha-numeric data, caller ID information, clock settings and a series of pre-determined greetings through a telephone interface. Lo's design does not disclose hardware, systems, methods or other provisions capable of providing motion picture sequences that are user selected, or supplied though an external source such as a digital media system, DVD, hard drive or other data storage device. Moreover, like the other existing prior art, the system is monochromatic, and thus has support circuitry that limits data and image display throughput to the monochromatic color output of the included display devices. Even if the LED array disclosed on the device were made multi colored for ornamental purposes, the internal processing system is only designed to synchronize the on/off LED array switching to display alpha numeric data and a few low resolution symbols. Thus, its hardware and software cannot support streaming color video to display life like color images or color full motion video since the system is not wired and programmed to support true color synchronized switching or related data throughput.

Another spinning illuminated novelty device with synchronized light sources is described in U.S. Pat. No. 6,575,585 to Nelson, et al. This system is essentially a small, portable, battery operated amusement device that spins an array of lights. A small control circuit is located on the rotating member, proximal to the light array. The control circuit contains predetermined embedded ornamental patterns that cause the light array to illuminate in a predetermined pattern, synchronous to their speed. This causes an ornamental lighted display of shapes, colors, images or text to appear, depending on the predetermined pattern data integral to the control circuit. The embodiment shown uses a rotating contact system, such as a slip-ring style contact, to directly energize a control circuit and lights on the moving blades. This allows the stationary battery pack to directly connect its power wires to the illumination system and illumination control circuit on the moving rotor.

Because the system described by Chernick is primarily designed to be a very affordable children's toy, it is not capable of the advanced requirements necessary to display true color synchronized switching. The control circuit described is primarily a low cost pre-programmed device that displays a few visual patterns of varying colors. User selectability of pre-programmed patterns is not present, to keep production cost low, and minimize user interface parts. Therefore, upon turning the toy on, illumination patterns are generated by the digital controller in a predetermined manner. The user does not select from predetermined groups of images or messages to be displayed. Thus, the preferred embodiment shows only a simple on/off hardwired switch as the only human interface device present.

U.S. Publication No. 2004/0105256 to Jones discloses virtual color generating windmills, decorative spinners, and ornamental devices powered by solar or wind energy. Although very similar in ornamental value to the above mentioned illuminating toy by Chernick, the windmills disclosed by Jones utilize wind or solar energy to power integrated illumination systems that add to the visual interest of the windmill or similar outdoor ornament. In operation, as the windmill turns, sets of small LEDs scan rotational patterns of light creating an ornamental effect. While this system employs rotational scanning, images displayed contain little or no parameters for user selectability, and are incapable of displaying life like color images or color full motion video.

Another device which employs rotational image display is the I-Top, a small, portable device for gaming and amusement. The I-Top by Irwin Toys (I-Toys) is a pocket sized, battery operated spinning top with an integrated array of 8 LEDs. Using a button switch on the I-top, a user can select from a series of pre-programmed games that are integral to the unit's controller. Once the user selects a game, then spins the I-Top, the toy displays scores, messages and animations through its array of LEDs that form a virtual screen while spinning. A stable display image is accomplished by using a built in magnetic compass that always knows the instantaneous position of the top, and synchronizes the illumination display output flashes for each LED accordingly based on rotational position.

Due to the compass based position sensor disposed inside the I-Top, the beginning point of any chain of words on the I-Top is always pointing to Earth's magnetic North. Hence, magnetic north is used as a reference for the LED synchronization, and to calibrate in which direction or position the output text should appear.

While compass based positional synchronization works very well for devices which rotate in a horizontal plane, a traditional compass based system will not provide adequate positional synchronization for devices which rotate in vertical or near vertical planes. The internal compass can become confused if the azimuth or angular orientation of its intended operational plane is shifted to a degree at which it cannot properly track the Earth's magnetic field. In addition, proximity to various metals, magnetic fields, and radio frequency interference from cellular phones, vehicle electronics and other high frequency sources also interferes with compass function via direct magnetic field distortion or by subsequent inductive jamming of sensitive compass support circuitry. This confuses positional synchronization, and thus would corrupt and distort the images output on the illuminated array, making the device unsuitable for use in conjunction with vehicles and/or vehicle wheels.

Other devices which utilize scanning technology may be found on the internet. These devices are commonly known online as "propeller clocks." The name "propeller clock" is a slang term that describes many persistence of vision displays that arose as a niche hobby after Robert Blick created what is presumed to be the first persistence of vision LED display that displayed a clock face. The clock was comprised of a rotating LED array that spun much like an airplane propeller, thus initiating the term "propeller clock" that has become a generic name for many similar rotationally scanned devices. More specifically, most of these devices take the form of a rotating array of LEDs, a motor system to power the rotation, a system of delivering power to the motor and rotating LEDs, and a system to synchronously energize the LEDs, thus allowing the rotating array to visually display one or more desirable patterns.

In general, this body of prior art addresses and solves some of the technical challenges that surround all rotational displays. These technical challenges include construction of rotating displays, selection of appropriate high brightness LEDs for monochromatic displays, proper balance and vibration control of rotating displays, methods of delivering reliable electrical power to the rotating portion of displays, methods and hardware for position sensing on the display, data delivery for displaying images on rotating arrays, programmable integrated circuit (PIC) programming and related costs.

While all of the prior art devices are capable of providing relatively simple displays, none of the prior art devices are capable of providing true color or streaming video. In addition, all of the prior art devices display images directly from their plane of rotation. That is, the devices twist the (normally horizontal) ground plane of the image or text around the axis of rotation causing, text, numbers and animations to be displayed and scrolled in a circular pattern along an artificial bottom line. This causes the user to read text that bends around the circle of rotation, as opposed to across the circle of rotation. This design feature is common to the prior art and is a result of a not defining a real horizontal reference within the actual programming code, data processes and internal feedback loops that process and ultimately synchronize output data to illuminate sections of a rotational display. Not defining a real visual ground plane reference for display purposes, and further not correlating a visual display ground plane with the horizon or actual ground, eliminates related programming complexities and internal algorithms. The non-presence of this feature in the prior art allows for the use of a simple, low cost microprocessor controllers with limited complexity. However, the devices can be difficult to read and render the possibility of full motion video displays across the entire virtual disk impossible.

Still yet, the geometry of all prior planar display devices have some object or component mounted at the center of the circle of rotation that blocks the presence of illuminating elements. Thus, the total display area that could potentially produce an illuminated image is hindered by a "hole" or circular blank spot at the middle of the circle. This geometric limitation, which also applies to and is later addressed by the invention disclosed herein, provides another reason why text and images are displayed in a manner to twist around the center of rotation. Simply put, if the center does not have illumination hardware, any image programmed to intersect the center of the circle would not display properly.

This same limitation also affected the quality of early scanning image systems, like those of Nipkow and Baird. It is also of importance to mention that the aforementioned display systems of the late 1800s and early 1900s, in many cases, did not utilize the full optical range of their scanning disks for this very reason. Instead, a dark colored shield would cover most of the scanning disk displays, and a small window cut in the shield would usually frame a small area toward the outside of the disk, where linear scanning velocities were the greatest. Through the window, a small portion of the scanning disk was visible, and the image or television program was synchronized to appear in this window. The dark colored shield that covered the majority of the scanning disk essentially prevented the observer from viewing areas that were optically distorted or incapable of displaying visual imagery, as was the axis of rotation and the areas proximal thereto.

Further yet, the prior art does not disclose or suggest a rotational display device which operates in conjunction with a motor vehicle. Nor does the prior art disclose any of the numerous variations and enhancements to wheel mounted display systems that are described herein in regards to the present invention.

Accordingly, it is a primary objective of the instant invention to provide a high quality rotational display apparatus in combination with a vehicular wheel to provide ornamental and functional displays.

It is a further objective of the instant invention to provide a rotational display apparatus having the capability of producing a true color images that are substantially equivalent to that of a modern day TV or high quality computer monitor.

It is yet another objective of the instant invention to provide a rotational display apparatus that is capable of displaying both cylindrical and planar type displays in a single apparatus.

It is a still further objective of the instant invention to provide a rotational display apparatus which extends the illuminating elements to the center of the wheel to allow center-crossing of images.

Yet another objective of the instant invention is to provide a rotational display apparatus in combination with a vehicular wheel capable of providing virtual headlight, tail light, brake light, and directional signals.

Still yet another objective of the instant invention is to provide a rotational display apparatus in combination with a vehicular wheel capable of displaying text and images across a linear bottom line.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

SUMMARY OF THE INVENTION

The present invention provides a system which integrates unique lighting technologies, switching systems, mounting systems, information delivery systems and power supply systems within a vehicular wheel to provide an advanced, high quality visual display apparatus. These technologies, and their many unique applications, provide for a novel and useful series of video display devices that are small, lightweight, efficient and have the capability of producing a clear, bright, high definition image that is equivalent to that of a modern day TV or high quality computer monitor. Further applications of the disclosed technologies allow the installation of compact rotary video displays in numerous applications where rotating portions of machinery are equipped with the disclosed technologies to display visual images, videos and text while rotating. The compact, energy efficient, high optical quality technology disclosed herein is relatively inexpensive to mass produce and can be applied to many unusual locations. The primary application for rotational scanning systems discussed herein is an electronically controlled display system disposed upon or made integral to a motor vehicle wheel with both ornamental and functional applications.

The system is preferably configured for connection to display information from a portable or stationary computing device that includes hardware and/or software, to provide, import, manipulate, store and selectively display visual information of the user's choice. Such devices may include, but should not be limited to, palm sized computing devices, portable video game systems, laptop computers, cellular phones, audio systems, navigation systems, vehicle electronics, mobile video systems, multi-function displays or other devices that typically employ a visual display.

The computing device transfers information regarding the data to be displayed to a rotatable assembly which includes a controller and an illuminating assembly. The illuminating assembly includes a plurality of illuminating elements. The illuminating elements are synchronized by the controller to light-up specific elements of the assembly at specific times and/or positions during rotation. This causes the rotatable assembly to display predetermined image(s), text, animations or other visual information that is pre-loaded, programmed or otherwise provided to the controller from the computing device.

One embodiment of the device combines multiple synchronized illuminating assemblies that share a common axis of rotation, but are positioned at different angles with respect to the axis, to provide more than one image plane or more than one angle or set of angles for light emission direction. Such an arrangement, when synchronized to minimize interference and separate images in a predetermined sequence, provides a three dimensional image.

In further embodiments the instant invention may be utilized for use as a display system in rough service environments such as on helicopter main blades, tail rotors, impellers, turbines, machine tools or rotating components in manufacturing systems and engines.

DETAILED DESCRIPTION OF THE INVENTION

Figure 1:
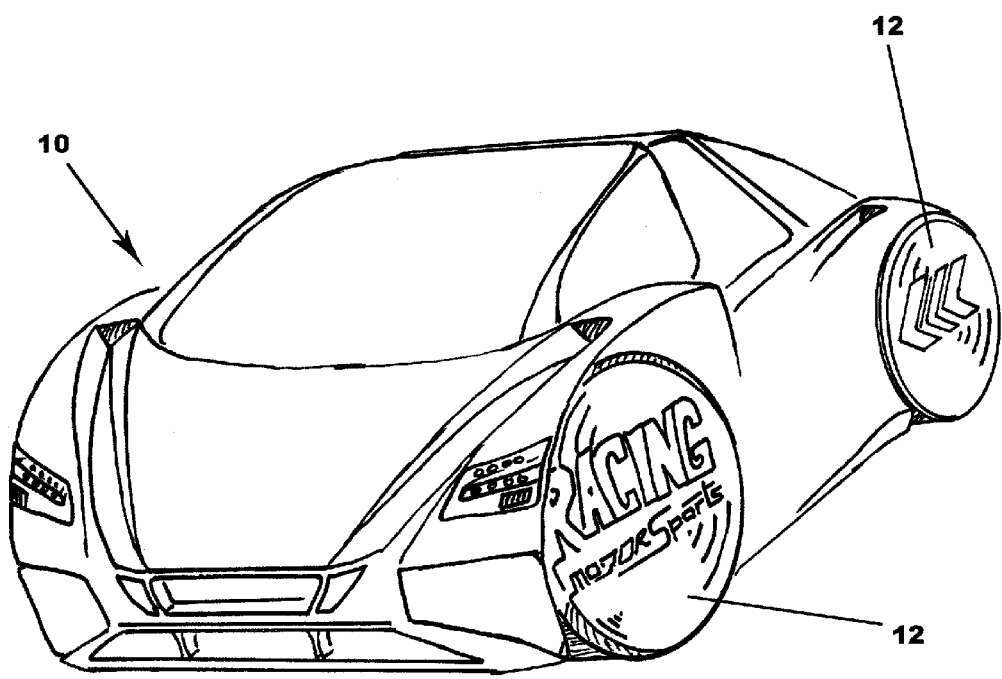
FIG. 1 is a perspective view of a vehicle illustrating the instant invention in operation upon a rotating motor vehicle wheel.
Figure 2:
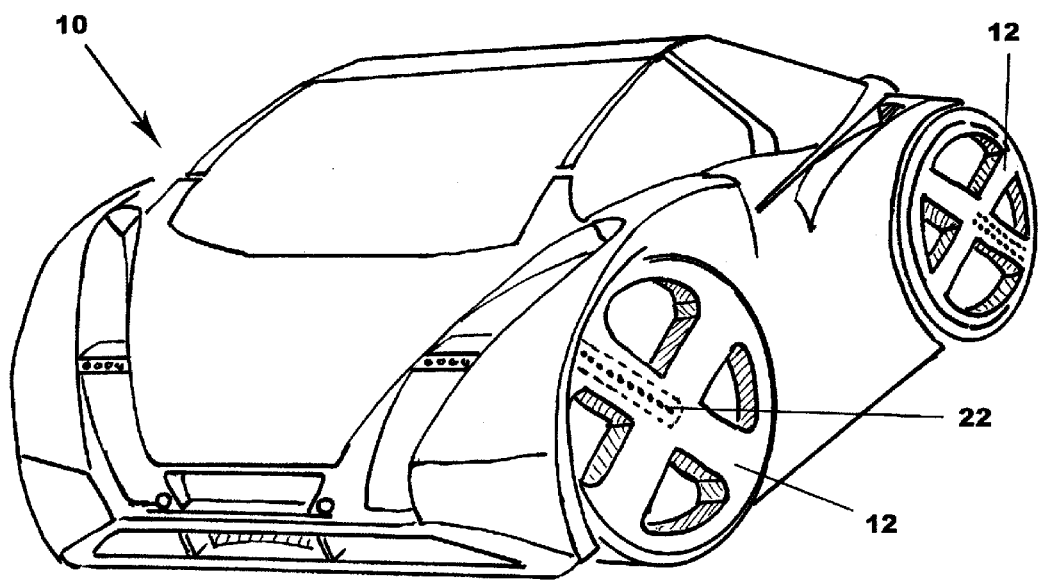
FIG. 2 is a perspective view of the vehicle shown in FIG. 1 illustrating one embodiment of the instant invention utilizing an LED illuminating assembly in conjunction with a motor vehicle wheel.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiments illustrated.

Referring to FIGS. 1-10, various embodiments of the instant invention are illustrated as being incorporated into the wheels of a motor vehicle 10. In general, the disclosed systems are rotational display systems 12 that display user selectable visual information such as images, text, numbers, symbols, animations, videos and the like upon the wheel of a vehicle during rotation thereof. It is important to note that the component description below is a general way to explain the system and its' basic components. Given modern technology, many or all of the components could be combined or split in many ways and thus should not be limited to the specific component descriptions included herein. The general components of the system include a computer 14, a rotatable assembly 24, and a means of power delivery 20 to the rotatable assembly.

Figure 5:
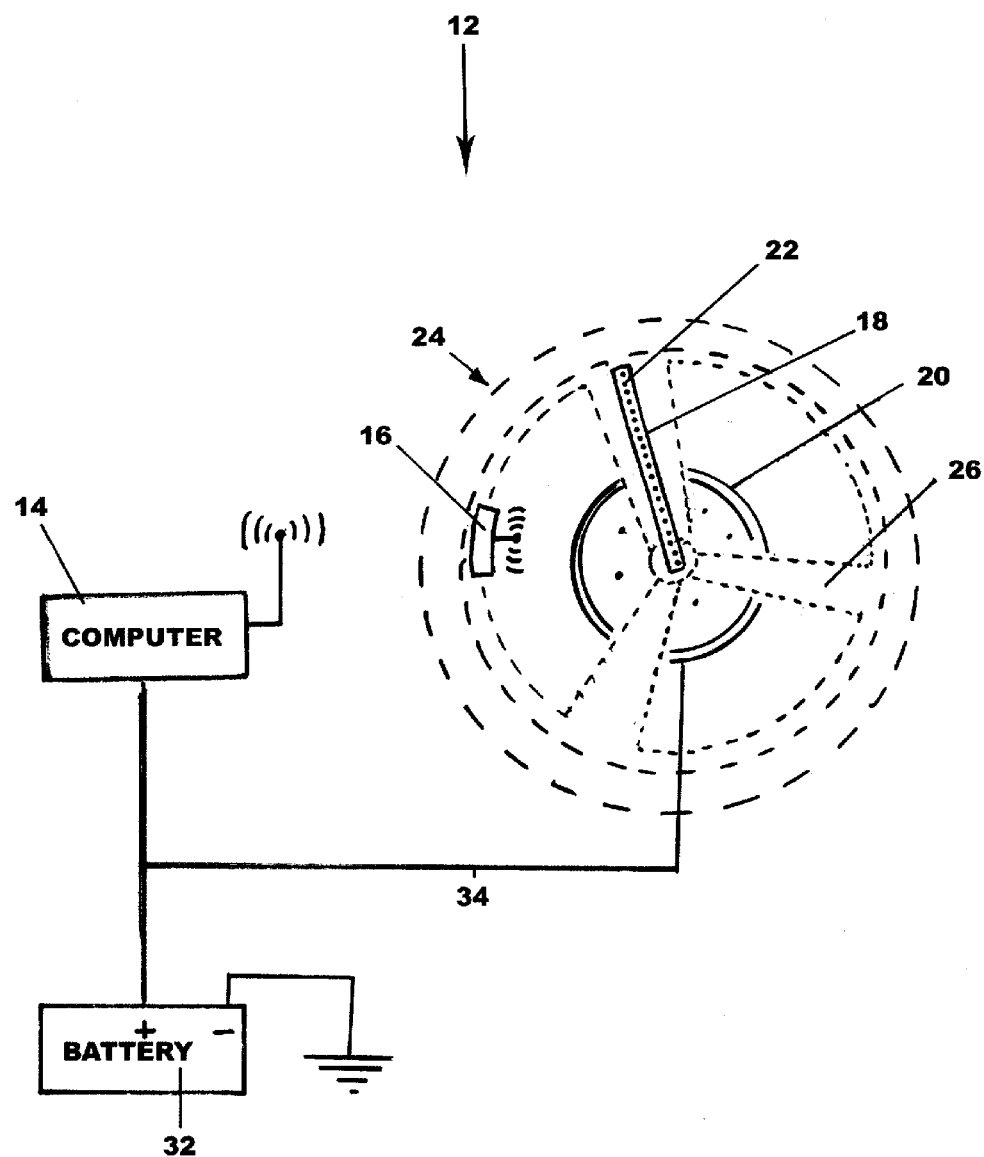
FIG. 5 is a schematic of one embodiment of the instant invention.
Figure 6:
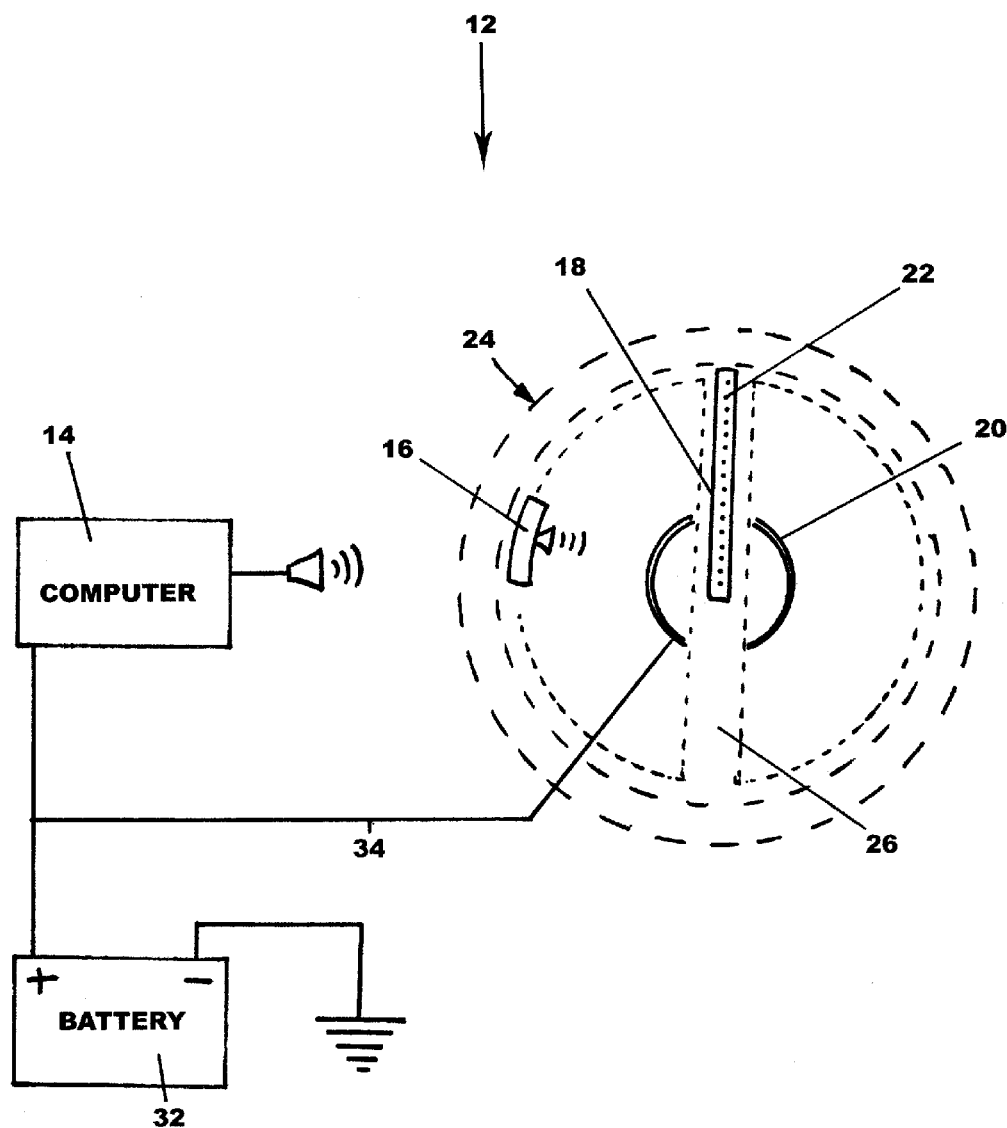
FIG. 6 is a schematic of one embodiment of the instant invention.
Figure 7:
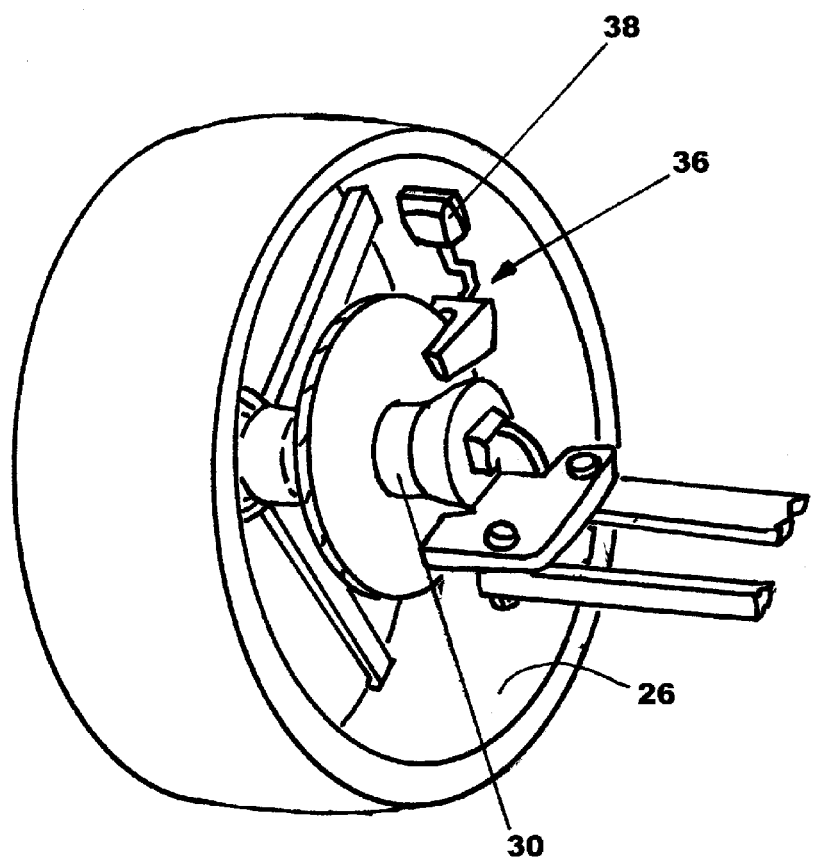
FIG. 7 is a partial perspective view illustrating one means for delivering power to the rotatable assembly.
Figure 8:
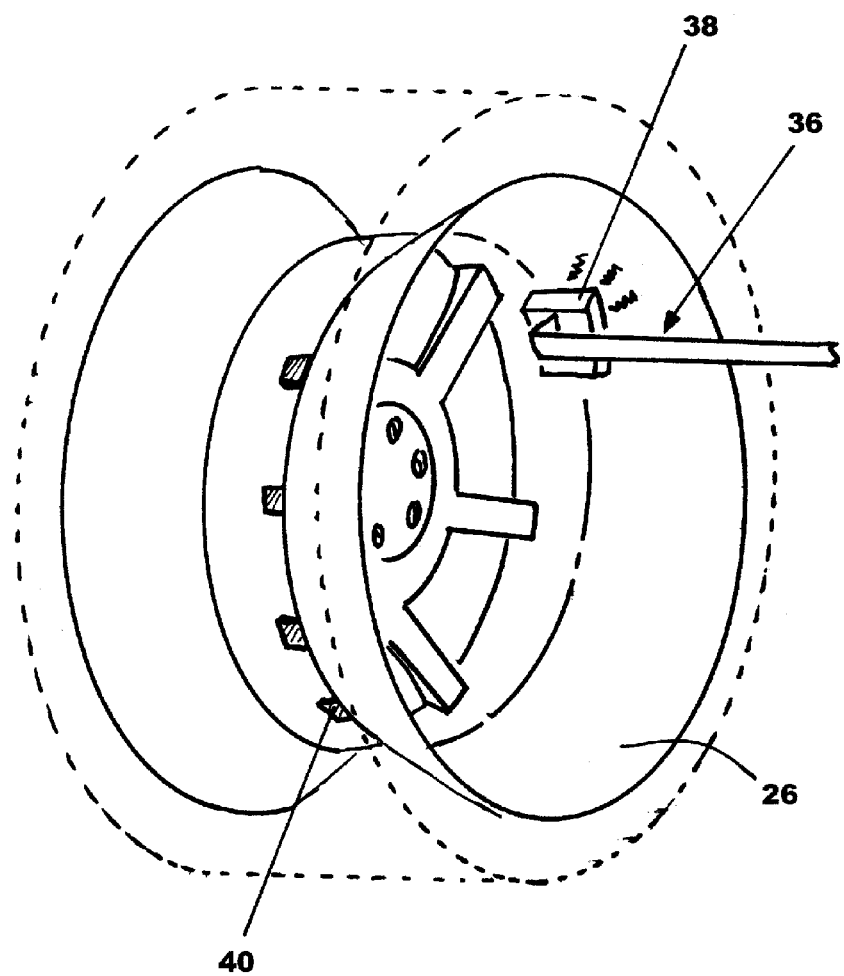
FIG. 8 is a partial perspective view illustrating one means for delivering power to the rotatable assembly.
Figure 9:
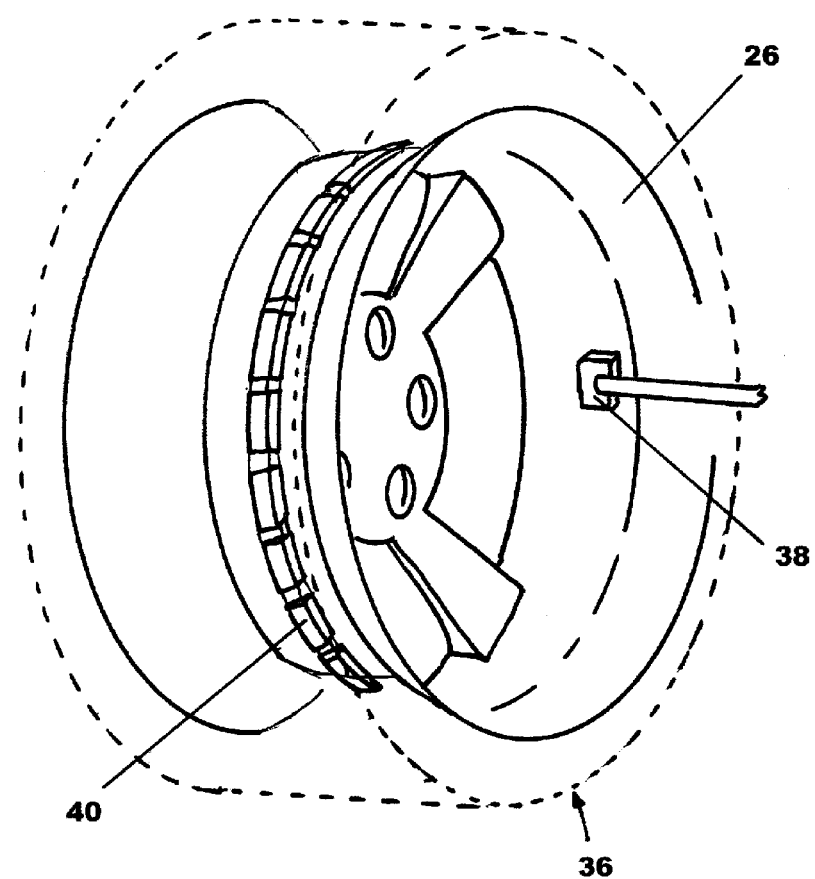
FIG. 9 is a partial perspective view illustrating one means for delivering power to the rotatable assembly.

The computer 14 provides for storage and recall of images which are wirelessly transferred to the rotatable assembly 24 which includes a controller 16 and an illuminating assembly 18 (FIGS. 5-6). The computer 14 is a microprocessor type device that allows users to upload and store images, videos, logos, text, and the like by accepting various software file formats which may include, but should not be limited to: JPEG, BMP, AVI, Quicktime and the like. The computer may also accept popular hardware methods of transferring stored digital information which may include, but should not be limited to: CDs, DVDs, various flash memory cards, USB ports, wireless connections, optical connections, IR ports and the like. The computer provides a high level of user selectivity and may include enhancements such as touch screens, digital pads, keyboards and suitable combinations thereof, all well known in the art, which allow a user to select which images or videos should be displayed on the rotational display system 12 during operation thereof.

The computer 14 electrically communicates with the rotatable assembly via the controller 16. The controller is preferably positioned within the rotatable assembly, illustrated herein as a motor vehicle wheel 26. The controller includes circuitry suitable to accept communications from the computer via radio, as shown in FIG. 5 or optical transmission, as shown in FIG. 6. A most preferred embodiment utilizes wireless micro transmitters and receivers, these devices are readily available from Freescale Semiconductor Inc. Of Austin, Tex. and include integrated circuits that can at least receive data from the computer as may be utilized to provide two-way communication between the computer and the receiver. The controller also includes circuitry capable of synchronously illuminating the illuminating elements 22 of the illuminating assembly 18, thus producing a visual output. The specific hardware and/or software utilized within the controller will vary based upon the type, size and quantity of illuminating elements, as well as the rotational speed of the rotatable assembly, and the complexity of text, numbers, images or animations to be displayed through the rotatable assembly 18. The primary job of the controller is to receive information regarding the desired display from the computer and synchronously energize individual illuminating elements, clusters or pixels within the illuminating assembly 18 to produce one or more predetermined images. In order to properly synchronize the illuminating elements 22 for illumination at specific positions within the rotation of the illuminating assembly 18, the controller must know its position with respect to a predetermined point within the rotation. Thus, the controller 16 includes a means of synchronization that perceives the passing of one or more positions during rotation of the rotatable assembly 24. The simplicity, complexity or overall effectiveness of any position sensing apparatus within the controller may vary depending on the application. Examples of readily available position sensing devices include, but should not be limited to: gyroscopes, magnetic sensors, Hall Effect sensors, lasers, infrared devices, radio-frequency devices, optical/reflective tachometers, laser tachometers, mechanical position (rotary) encoders, electromagnetic sensors, accelerometers, displacement sensors and suitable combinations thereof. In addition, Programmable Logic Control "PLC" technologies from various industrial automation systems, machinery and robotics utilize numerous varieties of advanced, miniature, rugged, programmable position sensing systems. These PLC position sensing systems and components have become standard, low cost, readily available and highly reliable within industrial automation and manufacturing technologies. Many miniature PLC components now feature sophisticated integrated memory and internal computing power sufficient to integrate many functions such as computing, control, sensing, feedback, programming and visual display output on one single compact rugged electrical device that can be programmed for unique applications. Computer Programmable Logic Devices (CPLDs) and Field Programmable Gate Arrays (FPGAs) such as those offered by Xilink and Altera semiconductor companies, both of San Jose, Calif., can be employed as sophisticated multi-input PLC position sensing and control systems. Similar miniature electronic hardware devices such as micro-scale radio transmitters like those offered by Analog Devices Inc of Norwood, Mass., coupled with miniature multi-axis position sensors such as those offered by Honeywell SSEC of Plymouth, Minn. allow a suitable PLC system to utilize wireless technologies for the acquisition, processing and sharing of position sensing data within a rotational display system. Various PLC systems and components provide yet another option for reliable rotational display synchronization hardware that are rugged and designed to operate in a variety of physically and electrically demanding environments such as within the wheel of a motor vehicle. Such systems and associated sub components are available from Omron of Kyoto, Japan and Silicon Laboratories of Austin, Tex.

The illuminating assembly 18 can have numerous inherent variations in size, length and resolution (resolution or definition is the number of actively switchable or addressable illuminating elements per unit of area; the higher number indicates that a higher quality image can be displayed). The illuminating assembly can also be made from many different illuminating elements which may include, but should not be limited to: light emitting diodes (LEDs), organic light emitting diodes (OLEDs), electroluminescent strips (ELs), liquid crystal displays (LCDs), thin film transistor liquid crystal displays (TFTs), plasma displays, small light bulbs or suitable combinations thereof, and may be used to form an appropriate display for predetermined applications. Regardless of the type of light generating instruments or apparatus used, individual elements of the illuminating assembly must be controllable to appropriately illuminate at predetermined positions during rotation, thus forming a predetermined image. Each choice of illuminating element has different characteristics, advantages and disadvantages. LEDs for example, are bright, efficient and durable, and can be surface mounted on a thin PC board with supporting electronic subsystems, all at a very low cost. A strip of color LCDs, such as the material used on laptop computer screens, boasts very high resolution and the ability to display life-like portrait quality pictures while rotating. LCDs derive their active light emitting elements from the controlled synchronization of individual pixels or groups of pixels that, viewed together, form an integral (somewhat virtual, software controlled) array of illuminating elements. Thus, the general definition of an illuminating assembly 18 is understood to apply to devices where light emitting elements 22 are connected and integral at a high density, miniature, microscopic or molecular level, such as the illuminating elements or combinations of the illuminating elements described above.

Figure 10:
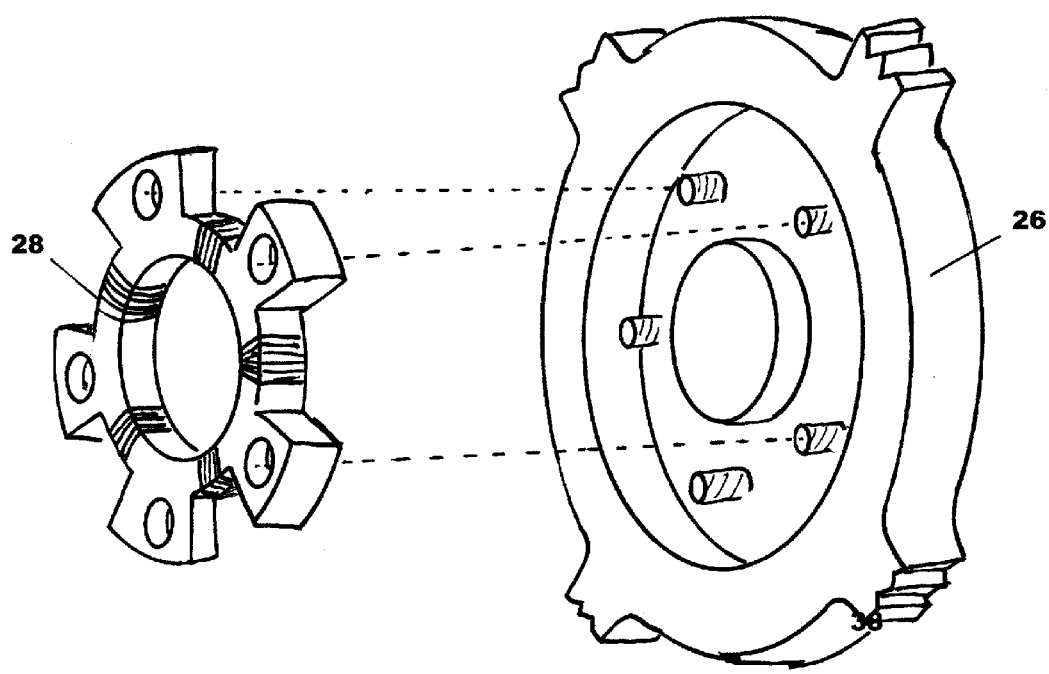
FIG. 10 is a broken partial perspective view illustrating one means for delivering power to the rotatable assembly.

Referring to FIGS. 5-10 various means of delivering power 20 to the rotating assembly 24 are illustrated. Regardless of the specific construction of the controller, position sensors, illuminating assemblies, interfaces, etc. there are many alternative and viable options for power delivery means that can provide adequate electrical power to the rotatable assembly that may be partially present on the moving (rotating) portion of the system. Batteries, solar panels, rechargeable systems and hardwired systems that employ slip-ring contacts or electrical commutator and brush assemblies are examples of some power delivery means that are well known in the art. Within the preferred embodiment a split high frequency transformer 36 is utilized. In this embodiment, the primary coil 38, in electrical communication with the vehicle battery, remains fixed to the motor vehicle 10, and the secondary coil 40 is integrated into the moving portion of the rotatable assembly 24, in this case the vehicle wheel 26. Other options may include various parasitic power generators that use micro magnetic assemblies or piezo electric devices to produce power from mechanical vibrations, harmonics or centrifugal forces (not shown). Further systems could employ a generator located inside a hub and axle assembly as shown in FIG. 10, or a free spinning generator that uses a counterweight to stabilize one part of a free spinning generator while the other part rotates with a rotatable member connected to, or part of the illuminating assembly (much like a Rolex perpetual watch winding mechanism that uses an internal rotatable counterweight to self wind an energy storage spring, but on a larger scale and adapted to generate electric power).

Referring to FIG. 10, an alternative embodiment of the instant invention is illustrated wherein a portion of the motor vehicle's drive-line and/or suspension 30 (FIG. 7) is used to transfer a magnetic field of a transformer from a fixed part of the motor vehicle to a secondary transformer coil 28 and subsequent power circuit integral to the rotating wheel. Within this embodiment the vehicle hub assembly, axle, wheel bearings, etc. act as a ferrous core for an electrical transformer to deliver power to the rotating wheel assembly.

Referring to FIGS. 1-11, the specific applications and specific uses of the rotary display system ultimately determine which variations of many possible system architectures will be employed. Likewise, the specific applications desired by the user will determine what specific visual images, text, animations or combinations are to be displayed. Consequently, specific details of the user's application will also determine system parameters, such as what colors, brightness, array size, array quantity, control systems, power supplies should be used to best match the display system design to its intended application. For example, as it is an object of the instant invention to display life-like images on a rotational display system without bending the horizontal ground plane around the axis of the display system, it is necessary to understand the operation of the prior art systems that wrap the horizontal plane around the axis of rotation. Within the prior art images or text to be displayed are scanned or programmed in a linear manner, much like a desktop scanner or photocopier moves a lighted bar across an image using a flat rectangular surface plane. At each point (pixel or dot) in the plane that contains the image or text to be displayed a digital processor assigns the corresponding X and Y coordinates of each point converting it into a simple data chain of X and Y coordinates. Essentially, the image to be displayed has each of its points graphed like it was to be reproduced on a rectangular, flat planar sheet of graph paper. The data chain, like a bit map image, is then fed into the controller that illuminates the lighted portions of a rotating display.

Y represents the height position of a point to be displayed whereas X represents the horizontal position of a point to be displayed. Therefore, out of all XY coordinate pairs that form the image, the lowest Y coordinate is assigned to be displayed on the illuminating section closest to the axis of rotation and the highest Y coordinate is assigned to the illuminating section of the display that is closest to the perimeter.

The points on the X axis (that each pair with a respective Y coordinate) are assigned to an arbitrary predetermined starting and stopping point that correspond with one 360 degree rotation of the circular display system. In essence, the lowest X value is assigned to the degree position where the image begins in the rotational sweep and the highest X coordinate is assigned to the degree position where the image ends. In essence, an XY coordinate system is converted to display Y coordinates (as illuminated sections) only after the X coordinate set has been converted to represent angular positions on a circular system.

This allows illuminating portions of the display that correspond to the Y coordinates to illuminate at the instant that the illuminating display line crosses each point of rotation that corresponds to the matching X coordinate.

Likewise, this simple system easily converts text, images and other visuals to work properly on a rotational display by reassigning the X coordinate set to appropriate angular positions on the circle, while allowing the Y coordinate set to control which sections of the illuminating display are switched on or off, as it rotates past each point X. This also allows for easy positioning and orientation of an image to be displayed. For example, if a circle had its top most point defined as zero degrees and its bottom most point defined at 180 degrees, assuming that the circular scanning display apparatus moved in a clockwise direction, one could position an image or text on the right half of the circle by defining the lowest X value as zero degrees and the highest X value at 180 degrees. If one wished to further compress the text or image into the upper right quarter of the circle, one would assign the lowest X value to zero degrees and the highest X value to 90 degrees.

This aforementioned example of how a display scrolls images and text around a circle is exemplary only for a monochromatic system. If such a system were to have true color display capacities, it would essentially be the exact same example, in triplicate with one chain of XY coordinates for each of the primary colors to be output to a true color capable display.

In essence, the image to be scanned or digitally converted to binary data would be converted to XY coordinates just as described above, with one XY coordinate set for each color to be electronically mixed. In essence, the three coordinate data sets would be (Xred, Yred); (Xblue, Yblue) and (Xgreen, Ygreen). Likewise three separate data sets would have to be processed simultaneously in real time, fully synchronized, starting and ending at the same time without any relative processing delays between the red, blue or green data sets.

Consequently, the hardware would have to support triplicate electronic processing of each set and the rotational display system would also require tri-color separately addressable illumination sections to visually output the data. Although the electronic hardware and software is readily available to accomplish this, no such devices have yet been created. In application, it would be ideal to utilize micro sized tri-color LEDs due to their fast switching times, nearly instantaneous luminous rise and fall times, high brightness, high efficiency and point-source geometry. Likewise, one slim rotating line of such tiny, tri-color high brightness LEDs would effectively mix the primary colors at the same visual point, assuring that red, blue and green color output all occur at the same rotational angle. This would create a low cost, high quality rotational output capable of true color display.

If separate red, blue and green illumination sections are located at different points on a rotational display, output timing for each color must be appropriately shifted to maintain persistence of vision, by properly tricking the human eye into perceiving that all three colors are appearing to produce a seamless, true color image, by originating each of the primary colors from the same perceived location(s) in synchronous timing.

Take, for example, three sets of micro LEDs forming addressable illumination lines extending from about the axis to the perimeter of a rotational display system. The red LED line is arbitrarily located at the zero degree (straight up) position. The blue is at 10 degrees and the green is at 20 degrees, respectively, proceeding clockwise around the circle. Due to the relative positions, the light discharge positions for each primary color would need to be shifted. In essence, the green bar would switch it's green segments on t to represent a predetermined portion of an image to be displayed. We can call this arbitrary portion of an image "frame 1". So, the green bar would illuminate appropriate sections correlated to frame 1 at the 20 degree position in the rotation. However, the blue and red bards would have to wait until they are passing the 20 degree position to display their luminous patterns associated with frame 1. In essence, the red bar would require a shift in it's X coordinate set to add 20 degrees clockwise to it's luminous discharge timing for each frame. The blue bar would require a 10 degree forward advance on luminous discharge timing. The green would require a zero degree forward advance, meaning that the green has no shift in X coordinates (angular position) for a given frame; or simply put, the green becomes the arbitrary reference point that the other colors are referenced against the coordinate timing.

In order for any rotational display system, monochromatic or true color, to display an image across the entire circular face of a rotational display apparatus, the X and Y coordinates that define the image to be displayed in Cartesian terms must simply be converted to polar coordinates. In short, any Cartesian XY coordinate is subject to the Pythagorean theorem that models any XY coordinate as a triangle to derive the hypotenuse, or the distances from the center of the circle. In this case, the hypotenuse for a particular coordinate now defines the distances from the axis of rotation where a point, pixel or LED must illuminate at a predetermined angle to display a predetermined frame of visual output. The angle correlated to this distance is found by using the tangent function, thus indicating the numerical angle that would correlate the rotational position of the display. With the rotation angle and distance form the center known for any set of points that combine to define an image, it is possible to display an image or text across the full face of the circle. Likewise, any such image to be displayed should have it's coordinate sets electronically stored in polar form.

It is also important to note that software or hardware used to convert a Cartesian image to an identical image using polar coordinates should employ software or interfacing to properly center the zero point of the Cartesian system across the approximate center of the image before polar conversion. Failure to do this, depending on the specifics of the software developed for the rotational display, may cause an image to display off center as a result of positive integer values for any Cartesian XY coordinate set being converted to indicate a polar coordinate image in only one quadrant of a circle. Likewise, both hardware and software interfaces should have proper calibration features to properly center, tilt and properly adjust any displayed images.

Consequently, the process by which to convert digital images, text and full motion video to polar coordination for full face rotational display is not difficult. It does however require more computer programming, and subsequently more memory that an equivalent image that is displayed in wrap around mode as opposed to full face display mode. In addition, this mode is also capable of full color display if the same conversion and data processes are used for three primary colors, as described prior to be output to a capable full color rotational display device.

For example, a police vehicle 10 (FIG. 11) or ambulance may use the rotational display 12 to say "police" in a forward and/or side direction or to serve as extra emergency flashers. A large truck can display a "wide load" image on the wheel display.

A passenger car or truck can use the display as a system of virtual brake lights, directional signals, extra headlights, hazard flashers, etc. via a connection to the vehicle electric system. Such a system would use the vehicle's electric system to initiate the display of a flashing arrow image on the right wheels when the driver activates the right turn signal.

Figure 3:
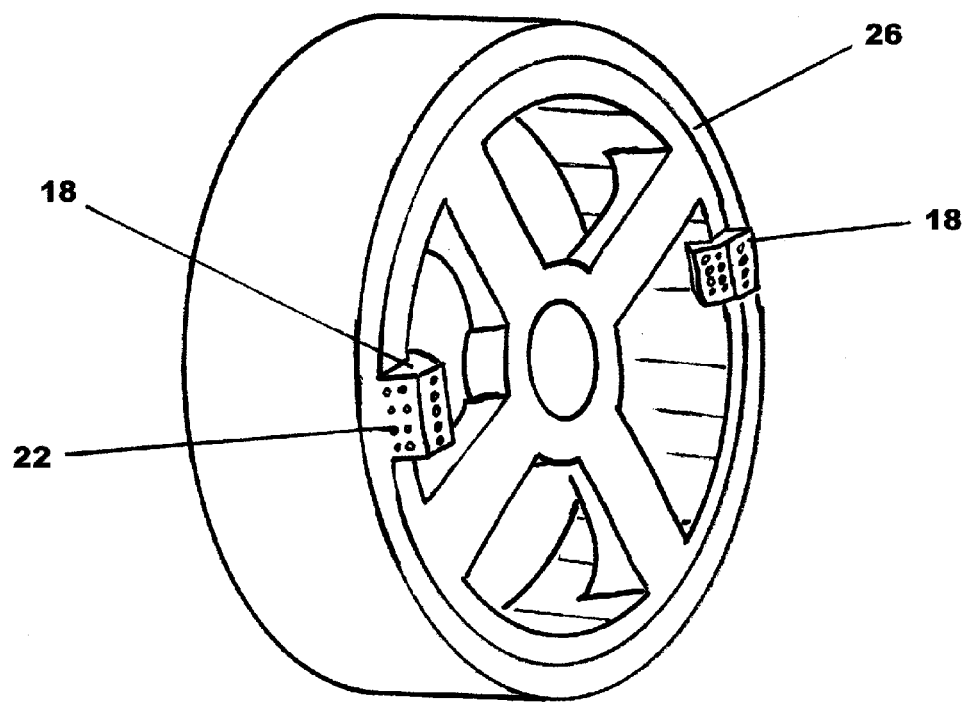
FIG. 3 is a perspective view of a motor vehicle wheel illustrating one embodiment of the rotating assembly of the instant invention for producing cylindrical or angular images.
Figure 4:
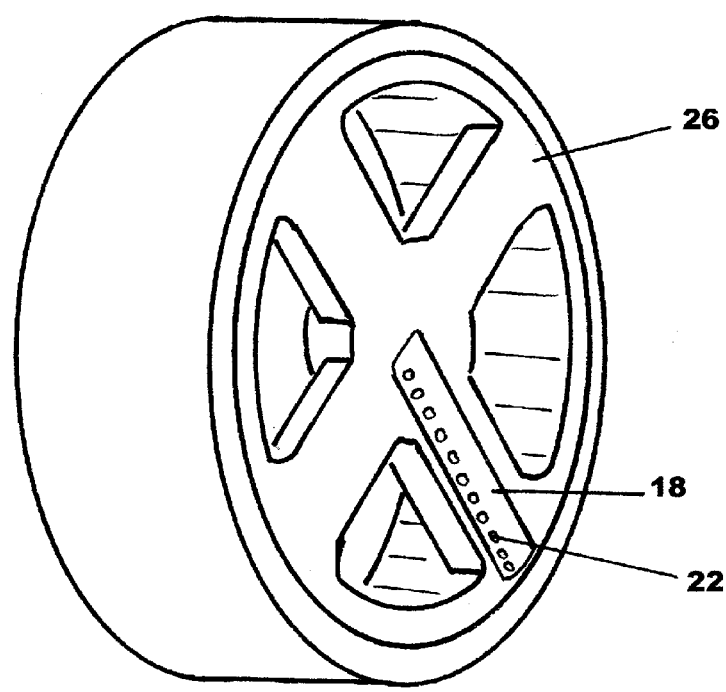
FIG. 4 is a perspective view of a motor vehicle wheel illustrating one embodiment of the instant invention utilizing and LCD illuminating assembly.
Figure 11:
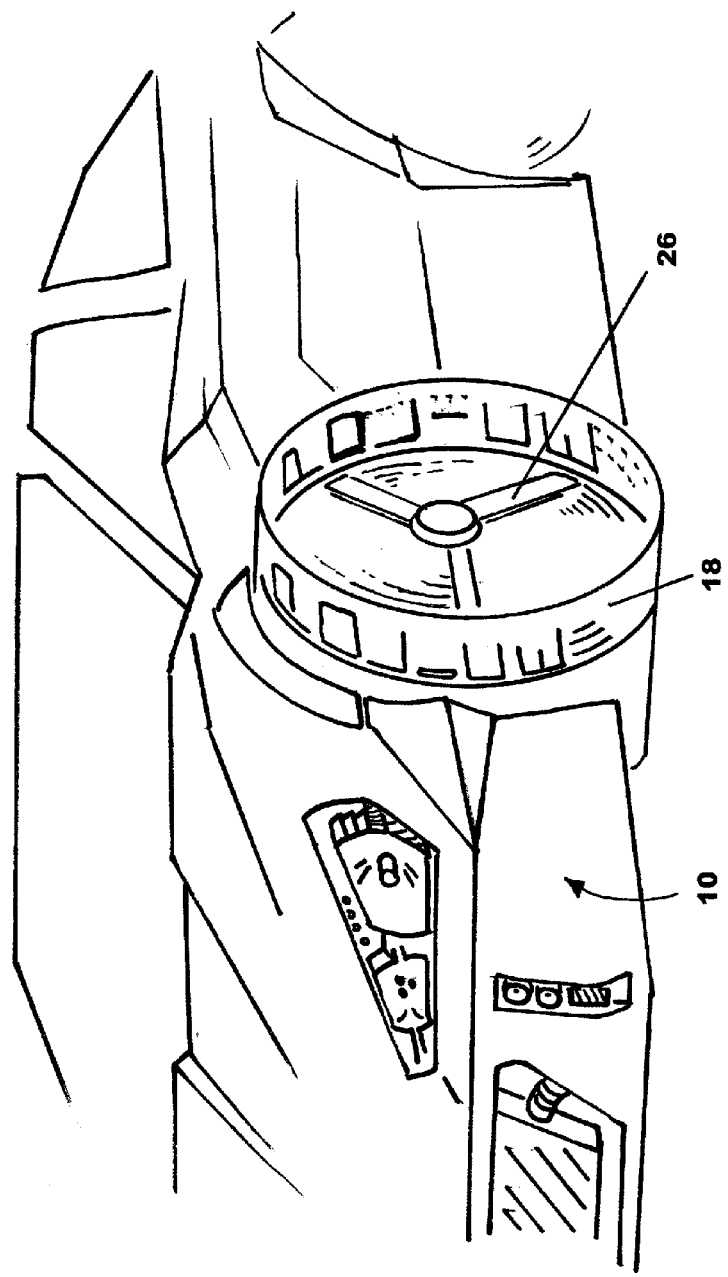
FIG. 11 is a partial perspective view illustrating the motor vehicle wheel of FIG. 3 in operation.

FIGS. 3 and 11 show unique shaped rotational display systems that have illuminating element assemblies shaped to allow virtual brake-lights that only shine backward from the rear wheels, virtual headlights that only shine forward, and directional signals that are viewable from many angles.

All aspects of the above described rotational display system can be manufactured with infinite variety. At the least expensive end of the spectrum of product offerings, an aftermarket stick-on LED strip pre-programmed with a graphic or ornamental design can be applied to a wheel with no user interface needed. An inexpensive stick-on thin PC board type car novelty could provide quick installation at low cost. A product one step higher may have a single color or multicolor aftermarket LED display strip that can be attached to the wheel, with an inexpensive battery powered human interface (like a small "credit card" sized remote control, similar to remotes included with aftermarket car stereos, located in the car) to select between a few pre-programmed graphics. More expensive models would progressively incorporate more sophisticated controllers with more advanced connectivity to external software image sources. Likewise, more expensive systems would likely incorporate brighter, higher resolution LED displays with more substantial power delivery and data delivery systems at and around the vehicle wheel assemblies. The best quality systems would support true-color capability or at least highly synchronized multi-color capabilities to display a variety of images in life like color or near life like color. The most versatile variations of the product would have multiple illuminating assemblies and LED clusters at various positions on the wheel at one or more angles, and more complex software to support their proper light discharge timing. As shown in the drawings, the LED arrays (or any light producing arrays or clusters thereof) can be contoured and positioned to project light from the rims in many specific orientations. Light projecting toward the front of the vehicle can be made into a virtual supplemental headlight, fog light, driving light or other street legal form of forward illumination. The same arrays that pass rearward facing directions as the wheels rotate can be turned into virtual brake lights. The combination of various wheel mounted arrays and light clusters can be used as highly visible street legal directional signals with the use of standard DOT approved amber color. Likewise, sophisticated displays that utilize multiple illumination assemblies, or ones directed at various angles may require software such as a plug and play style driver that identifies the wheel size, illuminating assembly positions, illuminating element colors and multi-axis illuminating assembly angles to the control system in the vehicle to allow proper display synchronization to produce clear and properly positioned images. Likewise, a multitude of software programs would provide a high degree of variety in selecting both functional and ornamental images for the vehicle wheels.

Since a traditional motor vehicle wheel or rim will not display an image while it is rotating, this is a limitation of the disclosed invention. However, if one embodiment of the disclosed system utilizes the rims as directional signals, or hazard flashers, on board hardware or software could allow all appropriately colored LEDs to illuminate or flash appropriately while the wheel is stopped, thus allowing an observer to see proper directional signals or hazard flashers disposed on the wheel. The stopped wheel would not be able to display a graphic while stopped (such as a picture of a flashing yellow arrow indicating a directional signal). However, a wheel-at-stop default sequence could take advantage of all appropriately colored LEDs while the wheel is stopped by using them for directionals or hazard lights.

One alternative embodiment of the instant invention utilizes motor vehicle wheels which include "Spinners." Spinners is a slang term for freewheel rotating ornaments that are added to vehicle rims such as those disclosed in U.S. Pat. Nos. 5,290,094 and 6,663,187 the contents of which are incorporated herein in their entirety. These ornaments are typically placed on custom luxury cars and SUVs. They allow a portion of the vehicle wheel to continue turning while the car is temporarily stopped or slowed. A combination which includes spinners with the instant invention leads to a naturally advantageous combination. This would allow the continuous use of rotational display system for videos or graphics such as logos, ornaments, directional signals, brake lights, virtual headlights, etc.—even while the vehicle is stopped.

As a variation of the above embodiment, the spinners may further include activatable electric motors to rotate a portion of the rims while the car is stopped for extended periods of time, thus allowing the rotational image display to run constantly for display purposes such as a car show. Embedded software, related electrical power transmission hardware and data transmission hardware connected to the wheel display system can be used to monitor motor speed through the rotational displays' position sensor(s) and synchronization circuit(s). Motor speed or power can be adjusted or turned on/off via the controller in the vehicle. Synchronization circuits could monitor the differential rotational velocities between the rotating wheel ornament and the vehicle wheel thus adjusting motor speed to maintain full visual display capabilities throughout a range of vehicle speeds under predetermined conditions.

As a further variation of the above embodiment, a hubless spinner connected to the outer perimeter or thereabout of the wheel could be utilized. These spinners would be lighter in weight and less expensive than the present bulky ones. This embodiment could provide an option for sports car/high performance enthusiasts who do not desire traditional heavy spinners. However, a thin spinner "ring" with a few LED clusters or a continuous circle LED array disposed around the ring would give a driver the ability to have wheel mounted virtual driving lights, brake lights, directional signals and hazard flashers . . . but without the complexity of a larger spinner or a more complex wheel display system. This could be simple and utilitarian without the extra hardware or interfaces for uploading images. This would be more for the sports car enthusiast who wants the virtual signals/brakes/headlights to work while the car is stopped.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A rotational display system including:
   a computer for operator controlled storage and recall of images, said computer in wireless communication with a rotatable assembly, said computer configured to deliver instructions to said rotatable assembly regarding the display of at least one visual image so that said image is displayed on said rotatable assembly without bending the horizontal ground plane around an axis of rotation of said rotatable assembly;
   said rotatable assembly constructed and arranged to display said at least one visual image transferred from said computer, said rotatable assembly including an illuminating assembly, wherein said illuminating assembly includes at least one illuminating element, wherein said rotatable assembly is constructed and arranged for attachment to a wheel for rotation therewith, said wheel constructed and arranged for rotation about said axis of rotation;
   wherein operator selectable images may be displayed during rotation of said wheel about said axis of rotation.

2. The rotational display system of claim 1 wherein said computer includes a tangible computer readable carrier comprising computer program instructions constructed and arranged to allow an operator to import, manipulate, store and selectably display visual information of the operator's choice on said rotational assembly.

3. The rotational display system of claim 1 wherein said computer includes a physical computer readable carrier constructed and arranged to allow an operator to import, manipulate, store and selectably display visual information of the operator's choice on said rotational assembly.

4. The rotational display system of claim 1 wherein said rotatable assembly includes a controller for receiving wireless communications from said computer, said controller constructed and arranged to control operation of said at least one illuminating element of said illuminating assembly.

5. The rotational display system of claim 4 wherein said illuminating assembly includes a plurality of illuminating elements, wherein each of said illuminating elements are individually controllable for illumination by said controller.

6. The rotational display system of claim 5 wherein said illuminating assembly includes illuminating elements which include three primary colors red, green and blue, wherein said illuminating assembly is constructed and arranged to display true color.

7. The rotational display system of claim 5 wherein said illuminating elements extend from about said axis of rotation to about the perimeter of said wheel, whereby visual displays may extend across a face of said wheel during operation of said illuminating assembly.

8. The rotational display system of claim 5 wherein said plurality of illuminating elements are selected from the group consisting of light emitting diodes, organic light emitting diodes, electroluminescent strips, liquid crystal displays, thin film transistor liquid crystal displays, plasma displays, and small light bulbs.

9. The rotational display system of claim 4 wherein said rotatable assembly includes multiple illuminating assemblies that share a common axis of rotation, wherein each of said illuminating assemblies are positioned at different angles with respect to said axis of rotation to provide more than one image plane, wherein said controller is constructed and arranged to synchronize images generated by said illuminating assembly in a predetermined sequence to provide a three dimensional image.

10. The rotational display system of claim 4 wherein said controller includes circuitry constructed and arranged to synchronously illuminate said illuminating elements.

11. The rotational display system of claim 4 wherein said controller includes a means of synchronization, wherein said means for synchronization is constructed and arranged to determine the relative position of said rotatable assembly with respect to a fixed position during rotation thereof.

12. The rotational display system of claim 11 wherein said means of synchronization is selected from the group consisting of gyroscopes, magnetic sensors, Hall Effect sensors, lasers, infrared devices, radio-frequency devices, optical/reflective tachometers, laser tachometers, mechanical position (rotary) encoders, accelerometers, displacement sensors and electromagnetic sensors.

13. The rotational display system of claim 1 wherein said rotatable assembly is constructed and arranged to display planar images across the face of a motor vehicle wheel.

14. The rotational display system of claim 1 wherein said rotatable assembly is constructed and arranged to display planar images across the face of said motor vehicle wheel and cylindrical images around the perimeter of said motor vehicle wheel.

15. The rotational display system of claim 1 wherein said rotational display system is constructed and arranged to display streaming video.

16. A rotational display system including:
- a computer for operator controlled storage and recall of images, said computer in wireless communication with a rotatable assembly, said computer configured to deliver instructions to said rotatable assembly regarding the display of at least one visual image;
- said rotatable assembly including a substantially perpendicular surface extending outwardly with respect to an outer face of said wheel, said rotatable assembly constructed and arranged to display said at least one visual image transferred from said computer, said substantially perpendicular surface including an illuminating assembly, wherein said illuminating assembly includes at least one illuminating element, wherein said rotatable assembly is constructed and arranged for attachment to a wheel for rotation therewith, said wheel constructed and arranged for rotation about said axis of rotation;
- wherein operator selectable cylindrically shaped images may be displayed during rotation of said wheel about said axis of rotation.

17. The rotational display system of claim 16 wherein said rotatable assembly is constructed and arranged to display said cylindrical images around the perimeter of said wheel, wherein said cylindrical image may be utilized for vehicular headlights, taillights, brake-lights, and directional signals.

* * * * *